(12) United States Patent
D'Ercole

(10) Patent No.: US 8,840,088 B2
(45) Date of Patent: Sep. 23, 2014

(54) WIRE PULLING ASSIST DEVICE

(76) Inventor: Robert D'Ercole, Ramsey, NJ (US)

( * ) Notice: Subject to any disclaimer, the term of this patent is extended or adjusted under 35 U.S.C. 154(b) by 205 days.

(21) Appl. No.: 13/488,594

(22) Filed: Jun. 5, 2012

(65) Prior Publication Data

US 2013/0320279 A1     Dec. 5, 2013

(51) Int. Cl.
*B63B 35/03*     (2006.01)
(52) U.S. Cl.
USPC ............. 254/134.3 R; 254/134.3 FT; 81/300; 81/321
(58) Field of Classification Search
USPC ............. 254/134.3 R, 134.3 FT; 81/300, 321
See application file for complete search history.

(56) References Cited

U.S. PATENT DOCUMENTS

| | | | | | |
|---|---|---|---|---|---|
| 2,517,168 | A | * | 8/1950 | Bennek | 452/117 |
| 2,608,891 | A | * | 9/1952 | Haussler | 7/129 |
| 8,381,622 | B2 | * | 2/2013 | Roppolo | 81/321 |
| 2005/0188468 | A1 | * | 9/2005 | Crawford | 7/107 |

* cited by examiner

*Primary Examiner* — Lee D Wilson
*Assistant Examiner* — Shantese McDonald

(57) ABSTRACT

A wire pulling assist device has a tong shaped member having two arms biasedly connected at one of the two ends of each arm. A leaf spring at the connected ends of the arms maintains the device in a biasedly open position when the tool is not being used. Wire supports, consisting of curved elements, extend from near the second end of the arms. Applying a squeezing pressure on the arm members compels them and the wire supports towards each other, permitting the wire supports to be inserted into a hole in a metal stud. Metal clad wire can then be threaded through the wire supports and run smoothly and efficiently through the metal stud without impediment.

14 Claims, 4 Drawing Sheets

WIRE PULLING ASSIST DEVICE

BACKGROUND OF THE INVENTION

Electricians, electrical contractors, and others in the construction trade are required, from time to time, to run electrical wire and cable through support studs. Pulling smooth electrical wire or cable through studs, including metal studs, presents little problem or extended effort. However, running metal clad wire through openings in studs, particularly metal studs, is most often a time consuming annoyance.

Metal clad or MC wire comprises an outer covering of metal ridges. These ridges routinely get hung up on the sharp, thin edges of the metal stud openings through which they are pulled. This compels the electrician to stop the MC wire pulling process, walk over to the stud, dislodge the wire from the edge of the hole, and begin pulling again. The MC wire will inevitably hang up again and again, and the dislodging process will need to be repeated several times.

There is currently no means to prevent MC wire from getting hung up on the edges of holes in metal studs and to smoothly guide the wire through the hole while the wire is being pulled through the hole.

SUMMARY OF THE INVENTION

It is thus the object of the present invention to provide a wire pulling assist tool or device which effectively and efficiently addresses the problems associated with pulling MC wire or cable through a hole in a metal stud.

It is an object of the present invention to provide a wire pulling assist device which can be simply, easily, and manually utilized by the electrician, electrical contractor or others in the construction trade.

It is another object of the present invention to provide a wire pulling assist device which can be inserted into a hole of virtually any configuration in a metal stud in order to efficiently and effectively pull an MC wire through the hole, without the wire getting hung up or otherwise impeded within the hole.

It is a further object of the present invention to provide a wire pulling assist device which is lightweight and can easily be hung from a tool belt or stored in a tool box.

It is still another object of the present invention to provide a wire pulling assist tool which has few components and can be economically and simply manufactured.

These and other objects are accomplished by the present invention, a wire pulling assist device comprising a tong shaped member having two arms biasedly connected at one of the two ends of each arm. A leaf spring at the connected ends of the arms maintains the device in a biasedly open position when the tool is not being used. Wire supports, consisting of curved elements, extend from near the second end of the arms. Applying a squeezing pressure on the arm members compels them and the wire supports towards each other, permitting the wire supports to be inserted into a hole in a metal stud. Metal clad wire can then be threaded through the wire supports and run smoothly and efficiently through the metal stud without impediment.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
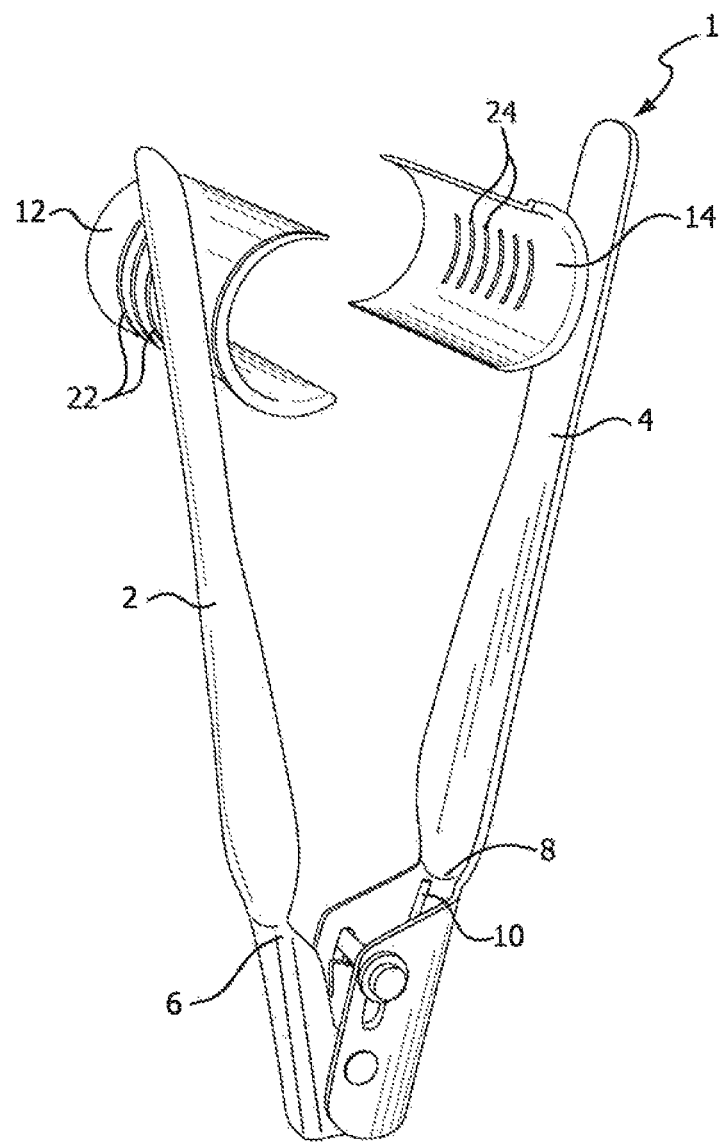
FIG. 1 is an isometric view of the device of the present invention in the open position.
Figure 2:
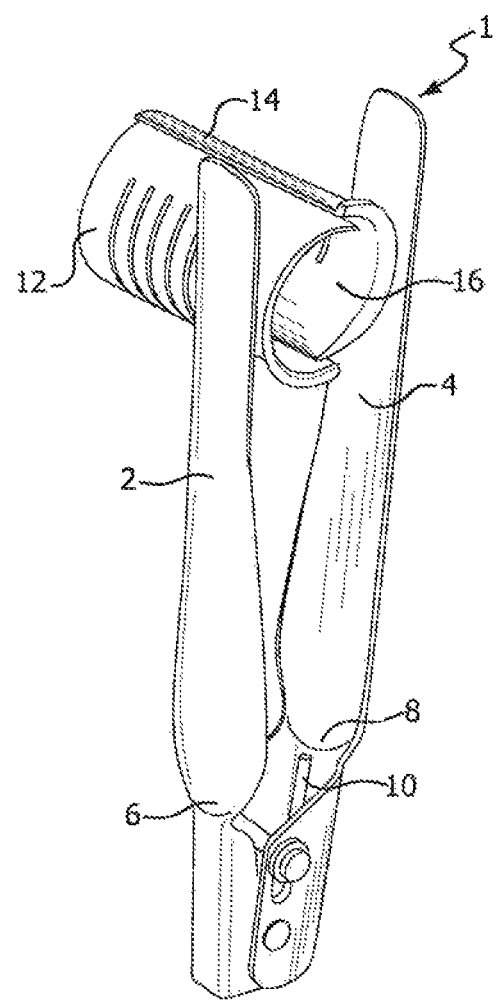
FIG. 2 is an isometric view of the device of the present invention in the closed position.
Figure 3:
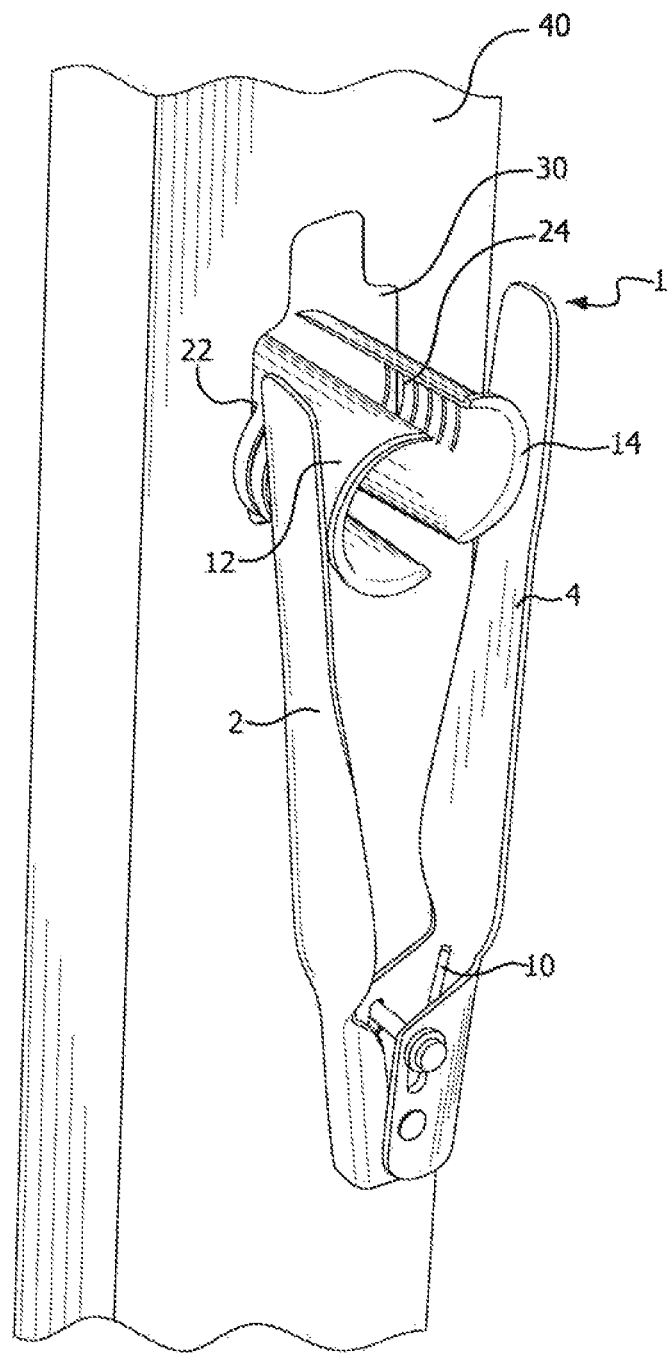
FIG. 3 is a view of the device of the present invention being inserted into a rectangular shaped opening in a stud.
Figure 4:
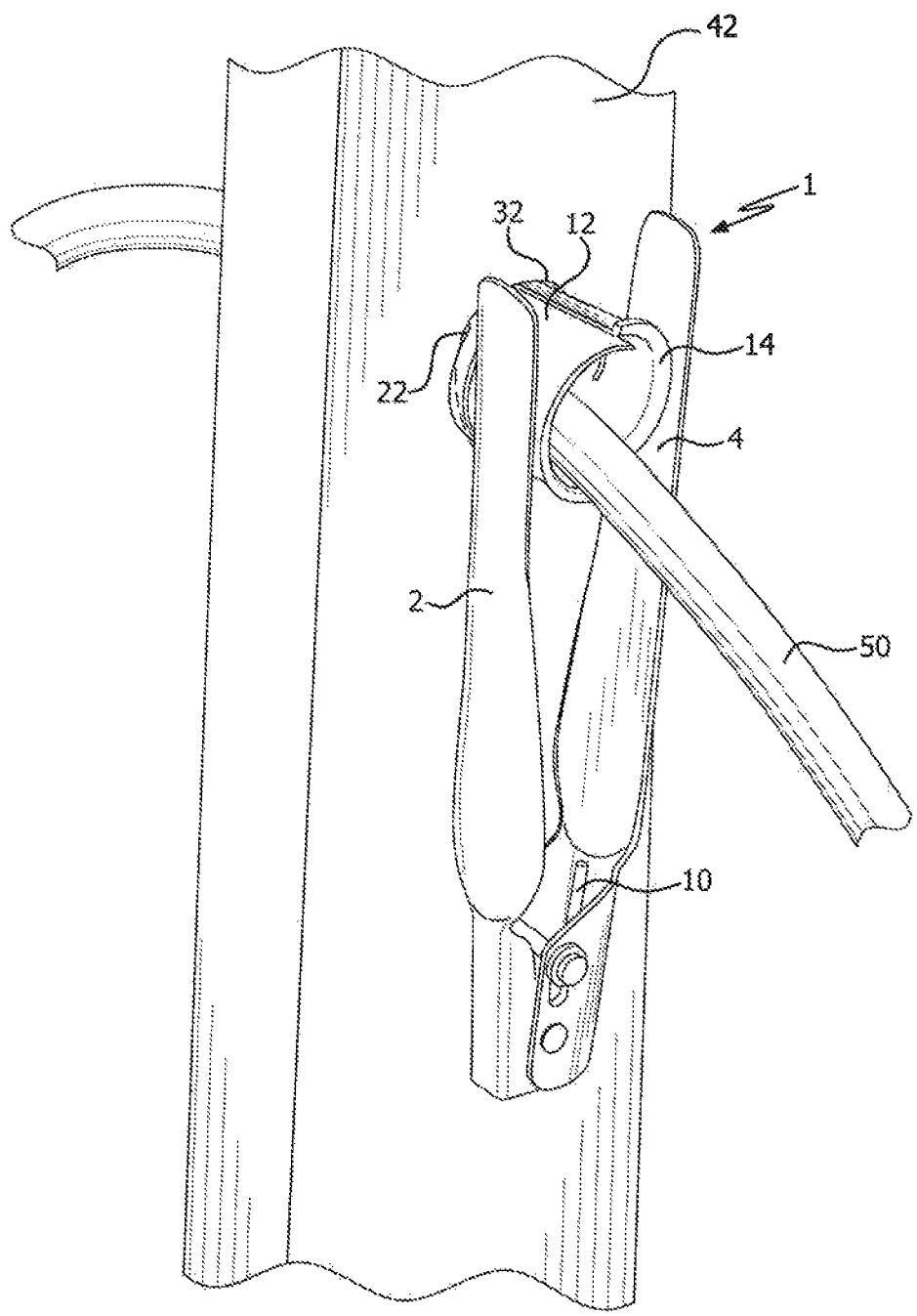
FIG. 4 is a view of the device of the present invention in use in a round opening in a stud.

Wire pulling assist device 1 is a tong shaped tool having arm members 2 and 4 secured together at their respective lower ends 6 and 8. Leaf spring 10 is located in the space between lower ends 6 and 8 and is configured to biasedly maintain arm members 2 and 4 spread apart in an open, first position. See FIG. 1. Application of manual pressure on arm members 2 and 4 will act against the biasing force of spring 10 and compel the arm members to rotate towards each other, to a closed, second position. See FIG. 2.

Wire supports 12 and 14 are attached to and extend from near the distal ends of arm members 2 and 4. Wire supports 12 and 14 consist of curved elements. When arm members 2 and 4 are pushed together, the end sections of wire supports 12 and 14 overlap each other in varying degrees. In this manner, it can be appreciated that the size of opening 16 formed between wire supports 12 and 14, when arm members 2 and 4 are compelled together, can be varied, depending on the amount of pressure exerted on the arm members.

Wire supports 12 and 14 each comprise a series of slit openings 22 and 24, which extend through the curved elements. Slit openings 22 and 24 are in spaced apart relation and parallel to each other.

Device 1 is used to assist in pulling an MC wire or similar ridged wire or cable over the sharp, thin edge of and through the hole in a metal stud. Arm members 2 and 4 are squeezed towards each other against the bias of spring 10, such that wire supports 12 and 14 are brought together, thus fully closing device 1. In this position, the ends of wire supports 12 and 14 overlap to the full possible extent and opening 16 is the smallest it can be.

Wire supports 12 and 14 are then inserted into rectangular shaped through-hole 30 in stud 40 or through circular shaped through-hole 32 in stud 42. The squeezing pressure on arm members 2 and 4 is then released, causing the biasing force of spring 10 to compel the arm members and wire supports 12 and 14 outward. As wire supports 12 and 14 move apart, one of the slit openings 22 and one of the slit openings 24 of the wire supports are pushed over an edge of holes 30 or 32. This secures wire supports 12 and 14 and hence device 1 in place within the holes in studs 40 or 42.

MC wire 50 can now be threaded and quite easily pulled through wire supports 12 and 14, and, therefore, through studs 40 and 42, smoothly and without impediment.

Device is removed from studs 40 and 42 by simply squeezing arm members 2 and 4 towards each other to again reduce the size of opening 16 between wire supports 12 and 14, and then withdrawing the wire supports from holes 30 and 32.

Wire pulling assist device 1 thus provides an easy and effective means to ensure that MC wire or similar ridged wire or cable can be pulled through a stud easily and smoothly, without getting hung up on the edge of the hole in the stud. It is a device which the electrician or electrical construction worker will find to be a valuable addition to his arsenal of tools.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A device for providing assistance in pulling wire through a metal stud comprising:
    a tong shaped member having spring means for maintaining the tong member in a biasedly open first position, the spring means being located at one of two ends of the tong member;
    wire support means at the second of the two ends of the tong member for guiding wire through a metal stud, said wire support means comprising two curved elements each having end sections, whereby in the open first position the elements are spaced apart and in a second closed position the elements are together with their end sections overlapping each other; and
    metal stud engaging means located in the wire support means for maintaining the wire support means within the metal stud, said metal stud engaging means comprising a series of slit openings into which edges of the metal stud are inserted.

2. The device as in claim 1 wherein the tong member comprises two arms and the wire support means are located on the arms.

3. The device as in claim 2 wherein one curved element is located on each of the arms.

4. The device as in claim 1 wherein the metal stud engaging means comprises at least two slit openings.

5. A device for providing assistance in pulling wire through a metal stud comprising:
    two arms biasedly connected by a spring at one of the two ends of each arm;
    wire support means located at the second of the two ends of the arms for guiding wire through a metal stud, said wire support means comprising two curved elements each having end sections, the curved element being rotatable between an open first position in which the elements are spaced apart and a second closed position in which the elements are together with their end sections overlapping each other; and
    metal stud engaging means located in the wire support means for the insertion of edges of the metal stud and for maintaining the wire support means within the metal stud.

6. The device as in claim 5 wherein the wire support means are located on the two arms.

7. The device as in claim 6 wherein one curved element is located on each of the arms.

8. The device as in claim 5 wherein the metal stud engaging means comprises at least two slit openings.

9. The device as in claim 5 wherein the metal stud engaging means comprises a series of slit openings.

10. A device for providing assistance in pulling wire through a hole in a metal stud comprising:
    two arms biasedly connected at one of the two ends of each arm, the arms being biasedly spread apart in an open first position and being rotatable towards each other to be configured in a closed second position;
    wire support means located at the second of the two ends of the arms for guiding wire through a through hole in a metal stud, said wire support means comprising two curved elements each having end sections, the curved elements being rotatable on the arms between an open first position in which the elements are spaced apart and a second closed position in which the element are together with their end sections overlapping each other and are configured to be inserted into the through hole in the metal stud; and
    metal stud engaging means located in the wire support means for the insertion of edges of the through hole in the metal stud and for maintaining the wire support means within the through hole to permit the wire to be smoothly pulled through the wire support means and the metal stud.

11. The device as in claim 10 further comprising spring means for maintaining the arms in the open first position and for maintaining the wire support means in the closed second position when the wire support means is within the through hole in the metal stud.

12. The device as in claim 10 wherein the metal stud engaging means are located in the curved elements.

13. The device as in claim 10 wherein the metal stud engaging means comprises at least two slit openings.

14. The device as in claim 10 wherein the metal stud engaging means comprises a series of slit openings.

* * * * *